United States Patent [19]

Sakamoto

[11] 4,389,818
[45] Jun. 28, 1983

[54] POWER OPERATED AUTOMOBILE WINDOW GLASS REGULATING MECHANISM

[75] Inventor: Toshinori Sakamoto, Hiroshima, Japan

[73] Assignee: Toyo Kogyo Co. Ltd., Hiroshima, Japan

[21] Appl. No.: 306,394

[22] Filed: Sep. 28, 1981

[30] Foreign Application Priority Data

Sep. 29, 1980 [JP] Japan .................. 55-139630[U]

[51] Int. Cl.³ .............................................. E05F 15/16
[52] U.S. Cl. .................................................... 49/349
[58] Field of Search ........................ 49/349, 362, 352

[56] References Cited

U.S. PATENT DOCUMENTS

| 3,334,443 | 8/1967 | Eskra et al. .......................... 49/349 |
| 3,724,133 | 4/1973 | Shirai et al. ......................... 49/349 |
| 4,004,371 | 1/1977 | Podolan et al. ...................... 49/352 |
| 4,167,834 | 9/1979 | Pickles ............................. 49/349 X |
| 4,168,595 | 9/1979 | Pickles et al. ...................... 49/352 |
| 4,182,078 | 1/1980 | Bartholomew .................. 49/349 X |

FOREIGN PATENT DOCUMENTS 54-15369 of 0000 Japan .

Primary Examiner—Philip C. Kannan
Attorney, Agent, or Firm—Fleit, Jacobson & Cohn

[57] ABSTRACT

A power operated automobile window glass regulating mechanism comprises a motor mounted on the window glass panel and having a driving pinion or sprocket. In the door panel, there is provided a flexible plastic strap having teeth or perforations for engagement with the driving pinion or sprocket.

9 Claims, 5 Drawing Figures

POWER OPERATED AUTOMOBILE WINDOW GLASS REGULATING MECHANISM

The present invention relates to automobile windows and more particularly to window regulating means for automobiles. More particularly, the present invention pertains to a power window mechanism wherein window glasses are driven by motor powers.

Conventional power window mechanisms include a window glass regulating mechanism comprised of a regulator arm mounted on one hand on a base secured to an automobile body panel and on the other hand slidably engaged with a guide member secured to the window glass through a window glass holder. The regulator arm is provided at its lower portion with a sector gear which is engaged with a pinion gear provided on the output shaft of a reversible motor. In the known mechanism, however, the regulator arm and the guide member are made of steel material so that the mechanism has been of an increased weight.

In order to solve the problem, the U.S. Pat. No. 4,004,371 proposes a window regulator including a perforated plastic tape having one end secured to the window glass. A guide track is provided in the body panel to guide a substantial portion of the tape and a sprocket provided on the output shaft of a reversible motor is engaged with the perforations in the tape. The proposed mechanism is advantageous over the conventional mechanisms in respect of weight, however, problems still exist in that it requires an extensive guide track member for guiding the flexible plastis tape and that a substantial length of plastic tape hangs down in the body panel in the form of a loop when the window glass is moved to a closed position.

In Japanese patent disclosure No. 54-151226 corresponding to Japanese patent application No. 54-15369 filed on Feb. 13, 1979 claiming the convention priority based on the U.S. patent application Ser. No. 877,264 filed on Feb. 13, 1978, there is disclosed a window regulating mechanism including a rack provided on the automobile body panel and a worm provided on the window glass and engaged with the rack on the body panel. A reversible motor is mounted on the body panel for driving the worm through a flexible drive shaft so that the window glass is driven by the motor. However, the proposed mechanism is considered disadvantageous in that it necessarily uses the rack which inherently increases the weight of the mechanism. Further, a flexible driving shaft must be used for transmitting the power from the motor to the worm.

It is therefore an object of the present invention to provide an automobile window regulating mechanism which is simple in structure and light in weight.

Another object of the present invention is to provide a power driven automobile window regulating mechanism in which the aforementioned problems of known structures can be eliminated.

According to the present invention, the above and other objects can be accomplished by a power operated automobile window regulating mechanism for driving a window glass panel between a closed and open positions in an automobile body panel, said regulating mechanism comprising flexible strap means secured to said body panel to extend along a direction of movement of the window glass panel, motor means carried on said window glass panel and having output means, said strap means having means engageable with said output means, guide means for forcing said strap means toward said output means so that the output means is drivingly engaged with the strap means. The term "door panel" used herein is intended to mean not only a fixed body panel but also a door panel hinged to an automobile body.

The output means on the motor means may be in the form of an output gear such as a pinion or a sprocket. A speed reduction gear mechanism may be provided in the output means. In a preferable aspect, the speed reduction gear mechanism may include an internal gear provided in the output gear and an output pinion provided on the motor output shaft and engaged with the internal gear. The engageable means on the strap means may be in the form of perforations or gear teeth.

The mechanism in accordance with the present invention is simple in structure and of a light weight as compared with the conventional structures. The driving power of the motor means can be effectively utilized to drive the window glass panel. Further, it has been found that vibrations of the window glass panel can be effectively suppressed by the mechanism of the present invention.

The above and other objects and features of the present invention will become apparent from the following descriptions of preferred embodiments taking reference to the accompanying drawings, in which.

Figure 1:
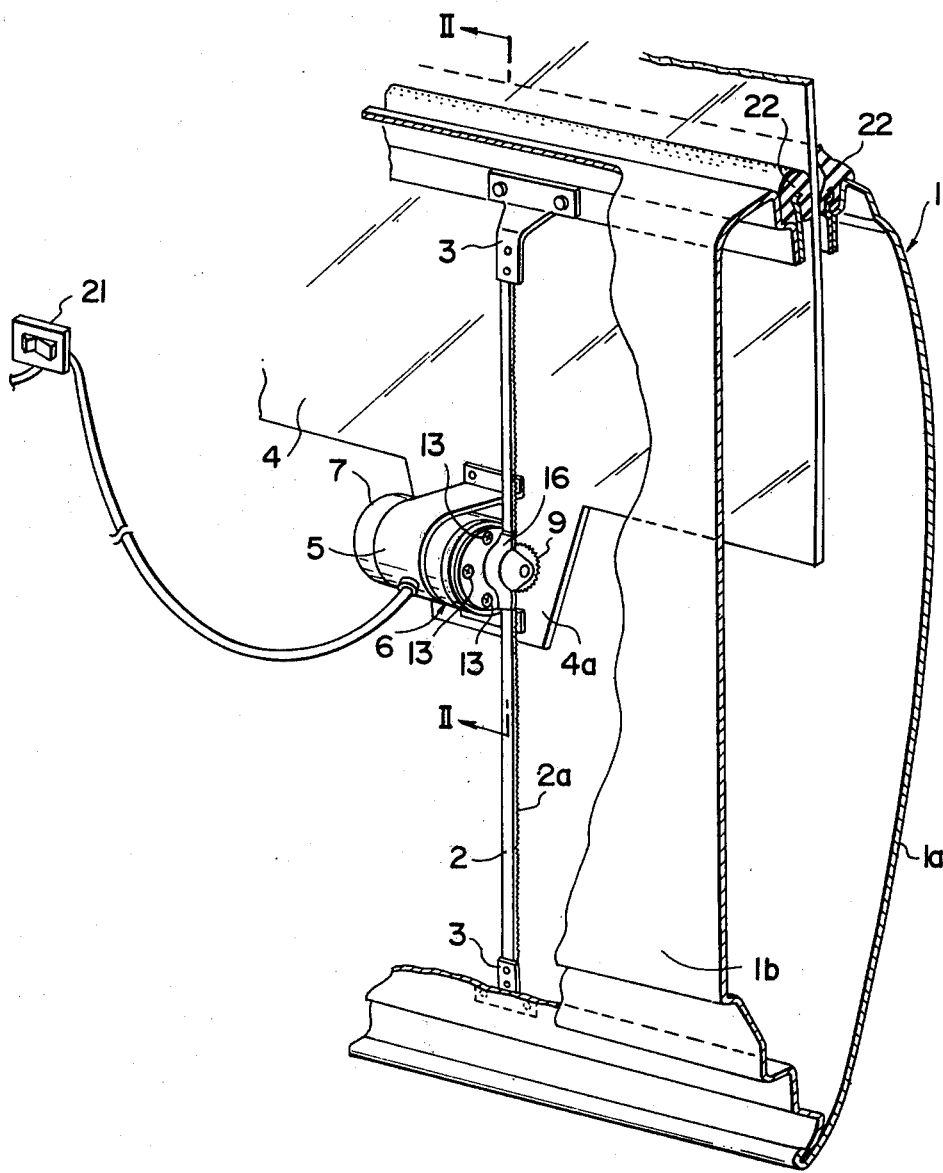
FIG. 1 is a fragmentary perspective view of an automobile door panel showing a window glass regulating mechanism in accordance with one embodiment of the present invention.
Figure 2:
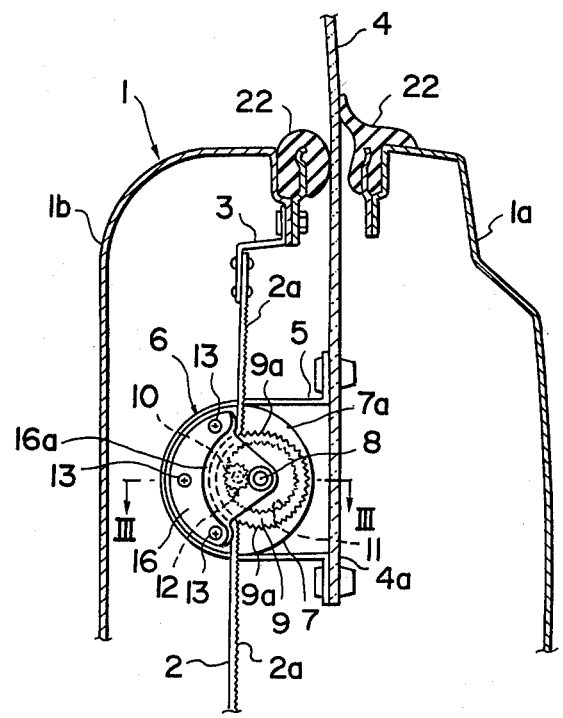
FIG. 2 is a sectional view taken substantially along the line II—II in FIG. 1.
Figure 3:
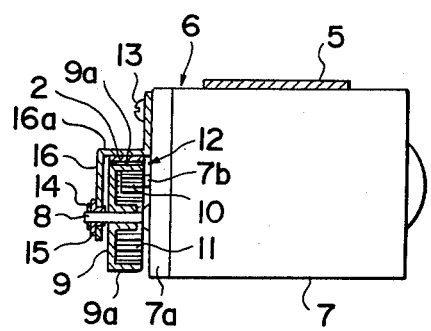
FIG. 3 is a sectional view taken along the line III—III in FIG. 2.

Referring now to the drawings, particularly to FIGS. 1 through 3, there is shown a door panel assembly 1 comprised of a door outer panel 1a and a door inner panel 1b. A window glass panel 4 is provided so that it can be retracted between the outer and inner panels 1a and 1b. In the door panel assembly 1, there is provided a window glass regulating mechanism including a flexible strap 2 made of a suitable plastic material. As shown in FIGS. 1 and 2, the strap 2 extends vertically in the door panel assembly 1 and secured at the upper and lower ends to the door inner panel 1b through brackets 3. The strap 2 is formed along its length with serrations or teeth 2a.

The window glass panel 4 is formed at the lower end with an extension 4a where a power device 6 is mounted through a bracket 5. The power device 6 includes a reversible motor 7 having a casing 7a held in the bracket 5. An output pinion 9 is rotatably supported on a shaft 8 which is in turn secured to the casing 7a. The pinion 9 has teeth 9a which are adapted to be engaged with the teeth 2a on the strap 2. Further, the pinion 9 is formed with internal teeth 11 and the motor 7 has an output shaft 7b provided with a pinion 10 which is adapted to be engaged with the internal gear teeth 11. The pinion 10 and the internal gear teeth 11 constitute a speed reduction gear mechanism 12 between the motor output shaft 7b and the driving pinion 9.

A guide bracket 16 is secured to the casing 7a of the motor 7 by means of screws 13 and supports the outer end of the shaft 8 through a bushing 15. A retaining ring 14 is provided on the shaft 8 for holding the bushing 15 in position. The guide bracket 16 has an arcuate guide portion 16a which extends substantially along a portion of the outer periphery of the output pinion 9. The strap 2 is passed between the guide portion 16a and the output pinion 9 with the teeth 2a faced to the pinion 9 so that the teeth 2a is forced into engagement with the teeth 9a on the output pinion 9. The outer and inner door panels 1a and 1b are provided at the upper edges with weather strips 22 as in conventional structures.

Figure 4:
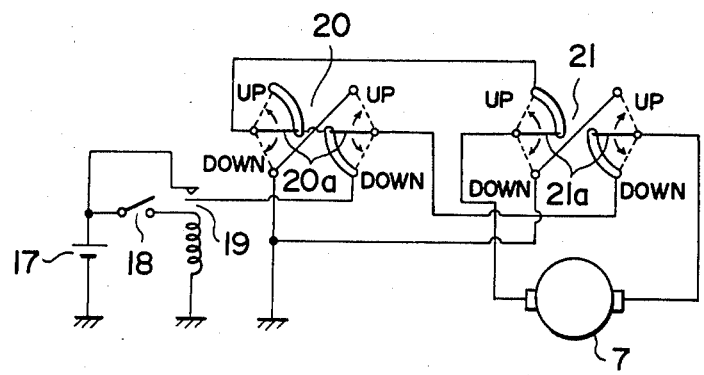
FIG. 4 is a diagram showing the motor control circuit.

Referring now to FIG. 4, there is shown a motor control circuit including an electric power source 17 and a main switch 18 for controlling a relay 19. The relay 19 has a contact connected with manual switches 20 and 21, one of the switches 20 and 21 being located in a driver's seat and the other in another seat. The switches 20 and 21 have movable arms 20a and 21a, respectively, which can be moved either of the UP and DOWN sides. The switches 20 and 21 are connected with the motor 7 so that the motor 7 is operated in one direction when either of the switch arms 20a and 21a are actuated in UP side and in the opposite direction when either of the switch arms 20a and 21a are actuated in DOWN side. Thus, in the aforedescribed mechanism, when either of the switches 20 and 21 is actuated, the motor 7 is energized so that the motor output shaft 7b and the pinion 10 are rotated. The rotation of the pinion 10 is transmitted to the output pinion 9 which is engaged through the teeth 9a with the teeth 2a of the strap 2 so that the glass panel 4 is driven in the vertical direction between the open and closed positions. Since the guide portion 16a of the guide bracket 16 ensures a positive engagement between the teeth 2a in the strap 2 and the teeth 9a in the output pinion 9 through an extensive arcuate length, it is possible to utilize the power of the motor 7 effectively to drive the window glass panel 4. Further, it is possible to constrain the window glass panel 4 against vibrations.

Figure 5:
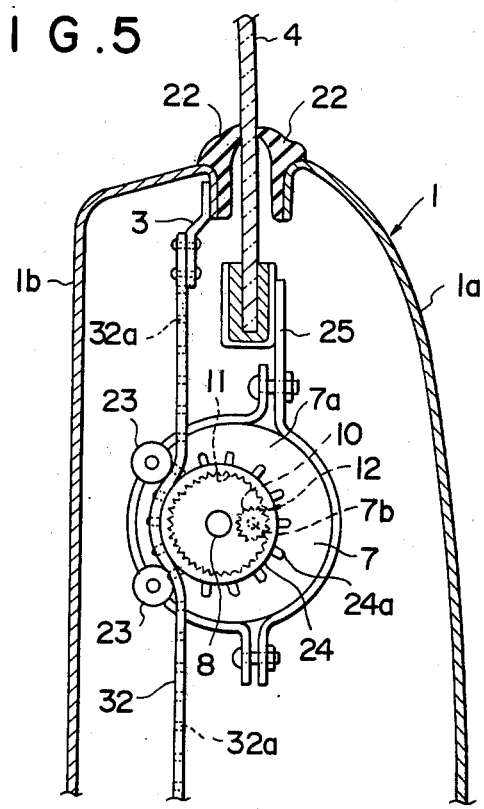
FIG. 5 is a sectional view similar to FIG. 2 but showing another embodiment of the present invention.

Referring now to FIG. 5, the embodiment shown therein is similar to the previous embodiment so that corresponding parts are designated by the same reference numerals as in FIGS. 1 through 3. In this embodiment, the output pinion 9 in the previous embodiment is substituted by a sprocket 24 having teeth 24a. The sprocket 24 is formed with internal gear teeth 11 which are engaged with a pinion 10 on the motor output shaft 7b as in the previous embodiment. A vertically extending flexible strap 32 is secured at the opposite ends to the door inner panel 1b through brackets 3 and has a plurality of perforations 32a for engagement with the teeth 24a on the sprocket 24. The motor casing 7a is held in position by a bracket 25 which is mounted on the lower end of the window glass panel 4. The bracket 25 carries a pair of rollers 23 which are located so as to engage the strap 32 so that the strap 32 is forced into engagement at the perforations 32a with the teeth 24a on the sprocket 24 through an extensive arcuate length.

In the particular embodiment, the motor 7 is located right beneath the glass panel 4, it is possible to decrease the thickness of the door panel assembly 1. In the illustrated embodiments, it is of course possible to attach the strap to the door outer panel.

The invention has thus been shown and described with reference to specific embodiments, however, it should be noted that the invention is in no way limited to the details of the illustrated structures but changes and modifications may be made without departing from the scope of the appended claims.

I claim:

1. A power operated automobile window regulating mechanism for driving a window glass panel between a closed and open positions in an automobile body panel, said regulating mechanism comprising flexible strap means secured to said body panel to extend along a direction of movement of the window glass panel, motor means carried on said window glass panel and having output means, said strap means having means engageable with said output means, guide means for forcing said strap means toward said output means so that the output means is drivingly engaged with the strap means.

2. A power operated automobile window regulating mechanism in accordance with claim 1 which includes speed reduction means provided between said motor means and said output means.

3. A power operated automobile window regulating mechanism in accordance with claim 2 in which said power reduction means comprises internal gear means provided in said output means and pinion means provided on output shaft means of the motor means and engaged with said internal gear means.

4. A power operated automobile window regulating mechanism in accordance with claim 1 in which said output means is a pinion gear.

5. A power operated automobile window regulating mechanism in accordance with claim 1 in which said output means is a sprocket.

6. A power operated automobile window regulating mechanism in accordance with claim 1 in which said output means has external teeth and the engageable means on the strap means has teeth which are adapted to be engaged with the external teeth on the output means.

7. A power operated automobile window regulating mechanism in accordance with claim 1 in which said output means is a sprocket having teeth and the engageable means on the strap means comprises perforations adapted to be engaged with said teeth on the sprocket.

8. A power operated automobile window regulating mechanism in accordance with claim 1 in which said guide means has an arcuate guide surface along which said strap means is adapted to slide.

9. A power operated automobile window regulating mechanism in accordance with claim 1 in which said guide means includes a plurality of rollers.

* * * * *